(12) United States Patent
Lu et al.

(10) Patent No.: US 6,868,582 B2
(45) Date of Patent: Mar. 22, 2005

(54) COMPUTER HINGE

(75) Inventors: Sheng-Nan Lu, Shulin (TW); Chung-Yu Lee, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 10/435,915

(22) Filed: May 12, 2003

(65) Prior Publication Data

US 2004/0226140 A1 Nov. 18, 2004

(51) Int. Cl.[7] ............................................. E05D 11/08

(52) U.S. Cl. ..................... 16/342; 16/348; 16/363; 16/374

(58) Field of Search ..................... 16/348, 342, 349, 16/363, 374, 377

(56) References Cited

U.S. PATENT DOCUMENTS

| | | | | |
|---|---|---|---|---|
| 5,287,596 A | * | 2/1994 | Chen et al. | 16/331 |
| 5,820,072 A | * | 10/1998 | Na et al. | 244/49 |
| 6,321,416 B1 | * | 11/2001 | Lu | 16/374 |
| 6,507,977 B2 | * | 1/2003 | Lu | 16/342 |
| 6,588,062 B2 | * | 7/2003 | Novin et al. | 16/342 |
| 6,622,344 B1 | * | 9/2003 | Lu | 16/342 |

* cited by examiner

*Primary Examiner*—Susanne Dino Barrett
*Assistant Examiner*—Mark Williams
(74) *Attorney, Agent, or Firm*—William E. Pelton, Esq.

(57) ABSTRACT

A computer hinge includes a hollow cylindrical sleeve which is to receive therein the first extension and the second extension of the first stem and the second stem respectively. The sleeve has an arcuate block integrally formed on one end face of the sleeve to optionally engage with opposite ends of the first connection portion. Furthermore, a limit formed on the second stem to selectively connect to the stop on the sleeve is able to provide a separation force to separate the screen from the main frame.

3 Claims, 6 Drawing Sheets

COMPUTER HINGE

BACKGROUND OF THE INVENTION

1. Field of the Invention

The present invention relates to a computer hinge, and more particularly to a computer hinge which is able to not only facilitate the separation between the screen and the main frame of a laptop computer, but also provide a stop to the screen after the screen is separated from the main frame.

2. Description of Related Art

With reference to FIG. 6, a conventional computer hinge is composed of a male part (50) and a female part (60). The male part (50) has a first stem (51) and an extension (52) integrally formed with the first stem (51). The female part (60) has a hollow cylindrical portion (61) formed to correspond to the extension (52) and a second stem (62) integrally formed with the hollow cylindrical portion (61).

When the pivot hinge of this kind is to be assembled, the extension (52) is interference fitted in the hollow cylindrical portion (61). Thereafter, with the first stem (51) and the second stem (62), the hinge is adapted to securely connect to surfaces of two elements of a device respectively, such as the screen and the main frame of a laptop computer. When the conventional computer hinge is in operation, the force required to maintain the screen at any desired angle is from the friction between the extension (52) and an interior face of the hollow cylindrical portion (61). Because this type of computer hinge provides only friction while in operation, the manufacturer still has to provide devices to facilitate the separation between the screen and the main frame and to stop the screen when the screen reaches a predetermined angle relative to the main frame. Mounting other devices to the computer hinge to respectively provide a separation force between the screen and the main frame and a stopping force to the screen increase overall cost and the complexity of the hinge, which is something every manufacturer tries to avoid.

To overcome the shortcomings, the present invention tends to provide an improved computer hinge to mitigate and obviate the aforementioned problems.

SUMMARY OF THE INVENTION

The primary objective of the present invention is to provide an improved computer hinge which can not only provide necessary friction but also provide a force to facilitate separation between the screen and the main frame.

Another objective of the present invention is to provide an improved computer hinge to provide a positioning effect to the screen relative to the main frame.

Other objects, advantages and novel features of the invention will become more apparent from the following detailed description when taken in conjunction with the accompanying drawings.

DETAILED DESCRIPTION OF THE PREFERRED EMBODIMENT

Figure 1:
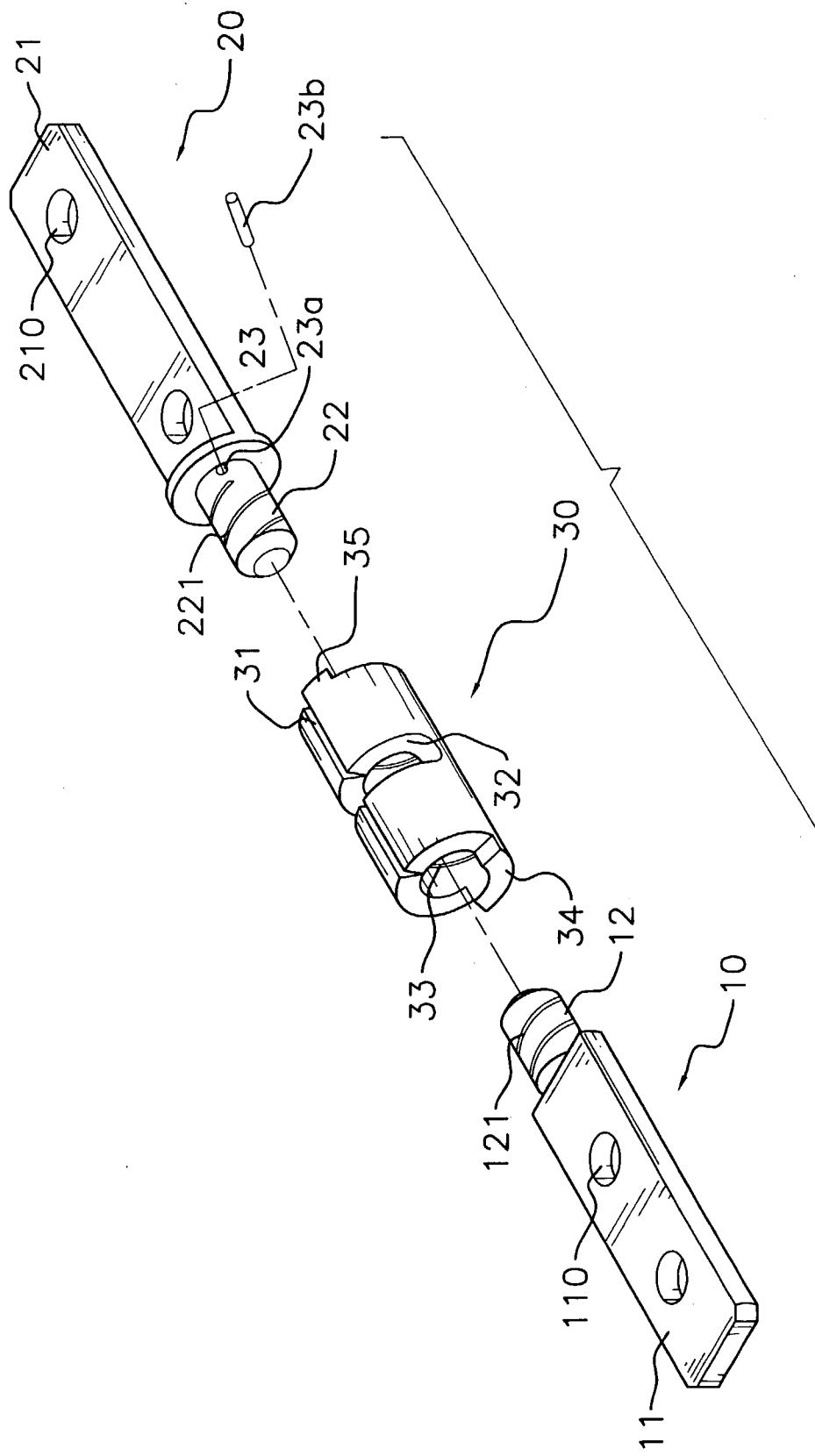
FIG. 1 is an exploded perspective view of the computer hinge of the present invention.

With reference to FIG. 1, the computer hinge in accordance with the present invention has a first stem (10), a second stem (20) and a sleeve (30).

The first stem (10) has a first connection portion (11) with through holes (110) defined through the first connection portion (11) so that the first connection portion (11) is able to be mounted on a surface, such as a laptop main frame, and a first extension (12) integrally formed with the first connection (11) and having a first slit (121) defined in an outer surface of the first extension (12).

The second stem (20) has a second connection portion (21) with second through holes (210) defined through the second connection portion (21) so that the second stem (20) is able to be mounted on a surface, such as a surface of a computer screen. The second stem (20) further has a second extension (22) integrally formed with the second connection portion (21) and having a second slit (221) defined in an outer surface of the second extension (22). A limit (23) is formed on a joint between the second connection portion (21) and the second extension (22). In a preferred embodiment of the present invention, the limit (23) is composed of a through hole (23a) defined at the joint between the second connection portion (21) and the second extension (22) and a pin (23b) extending into and securely received in the through hole (23a).

The sleeve (30) has a V-shaped cutout (31) longitudinally defined through an outer surface of the sleeve (30), a notch (32) radially defined through the outer surface of the sleeve (30) to communicate with both the cutout (31) and an inside of the sleeve (30), and a third slit (33) defined in an inner surface of the sleeve (30). An arcuate block (34) is formed on one end face of the sleeve (30) to correspond to the first connection portion (11). A stop is formed on the other end face of the sleeve (30) opposite to the block (34) to correspond to the limit (23).

Figure 2:
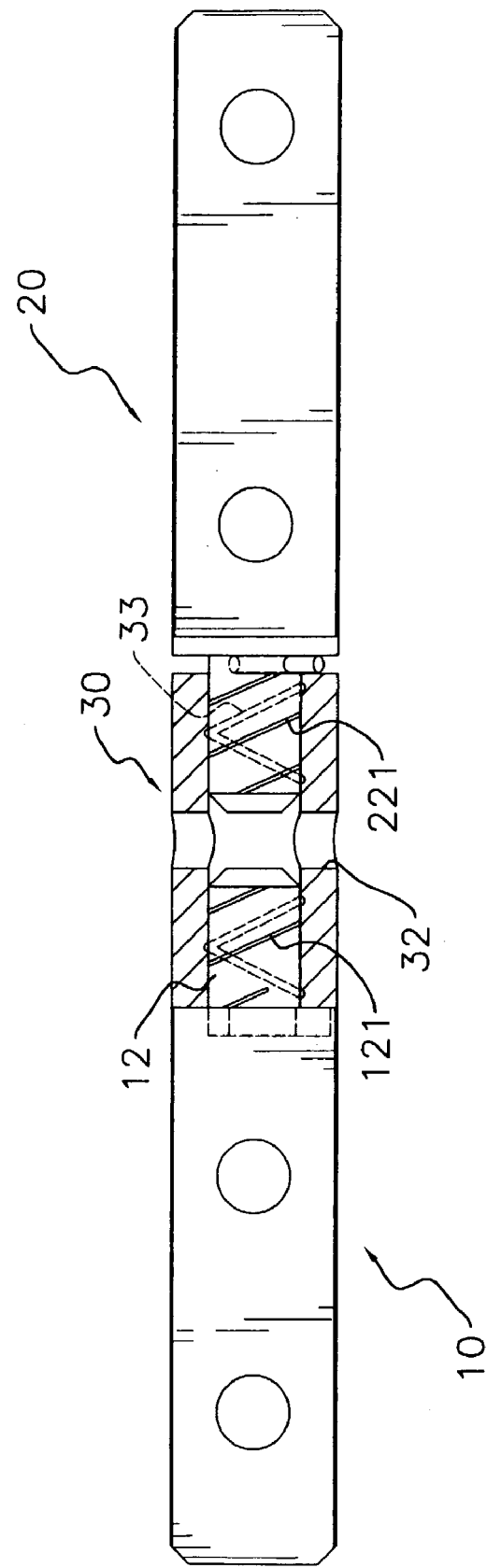
FIG. 2 is a side plan view of the combination of the computer hinge in partial section.

With reference to FIG. 2, when the computer hinge of the present invention is assembled, it is noted that the first extension (12) of the first stem (10) and the second extension (22) are inserted into the sleeve (30) from different ends so that the first and the second slits (121,221) engage with the third slit (33) to provide necessary lubrication after lubricant is added to the slits (121,221,33). After the assembly, the block (34) is located under the first connection portion (11).

Figure 3:
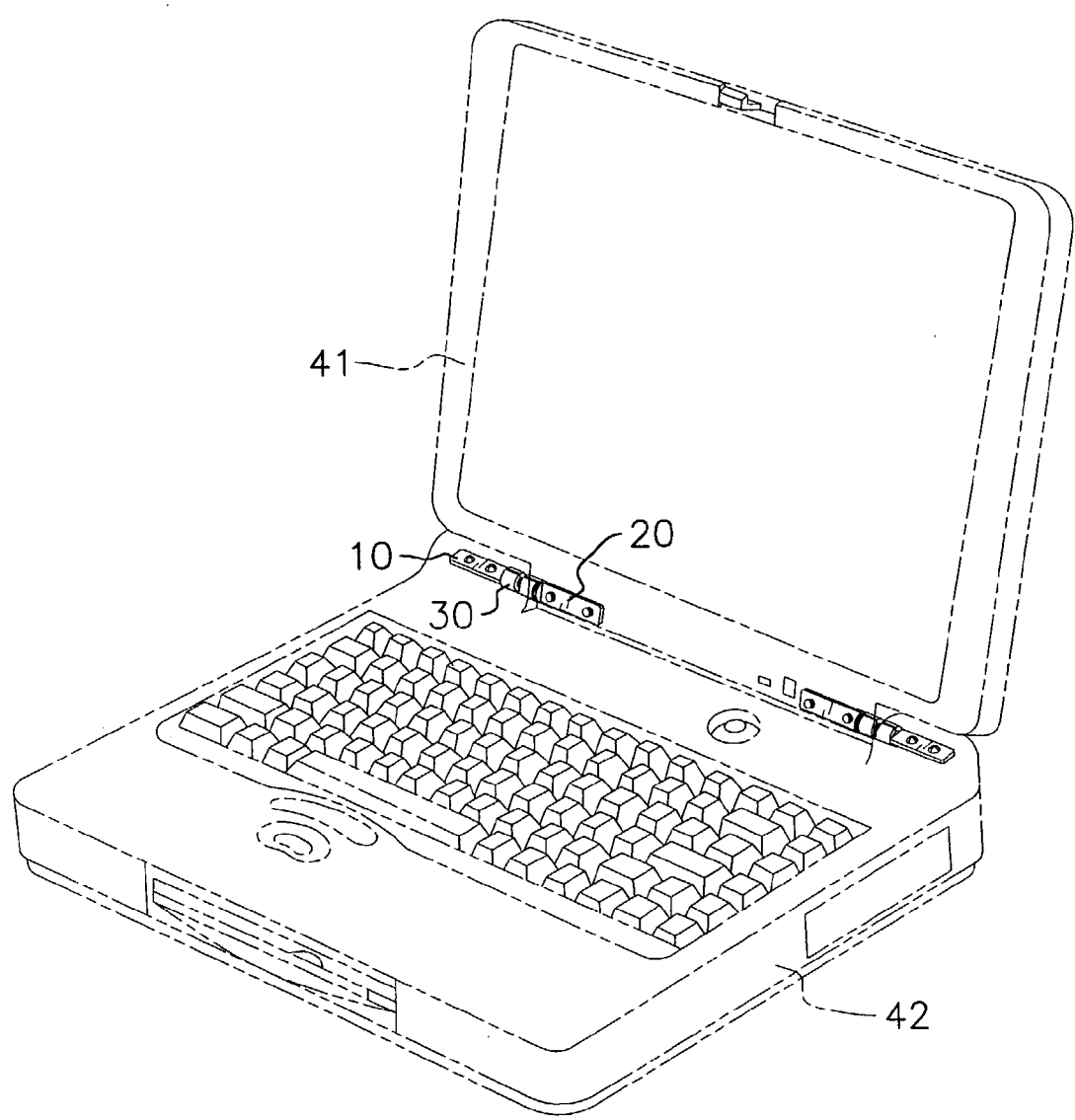
FIG. 3 is a schematic view showing the application of the hinge of the present invention to a laptop computer.

With reference to FIG. 3, after the first connection portion (11) is adapted to connect to a laptop computer main frame (42) and the second connection portion (21) is adapted to connect to a laptop computer screen (41) which is thus connected to the main frame (42).

Figure 4:
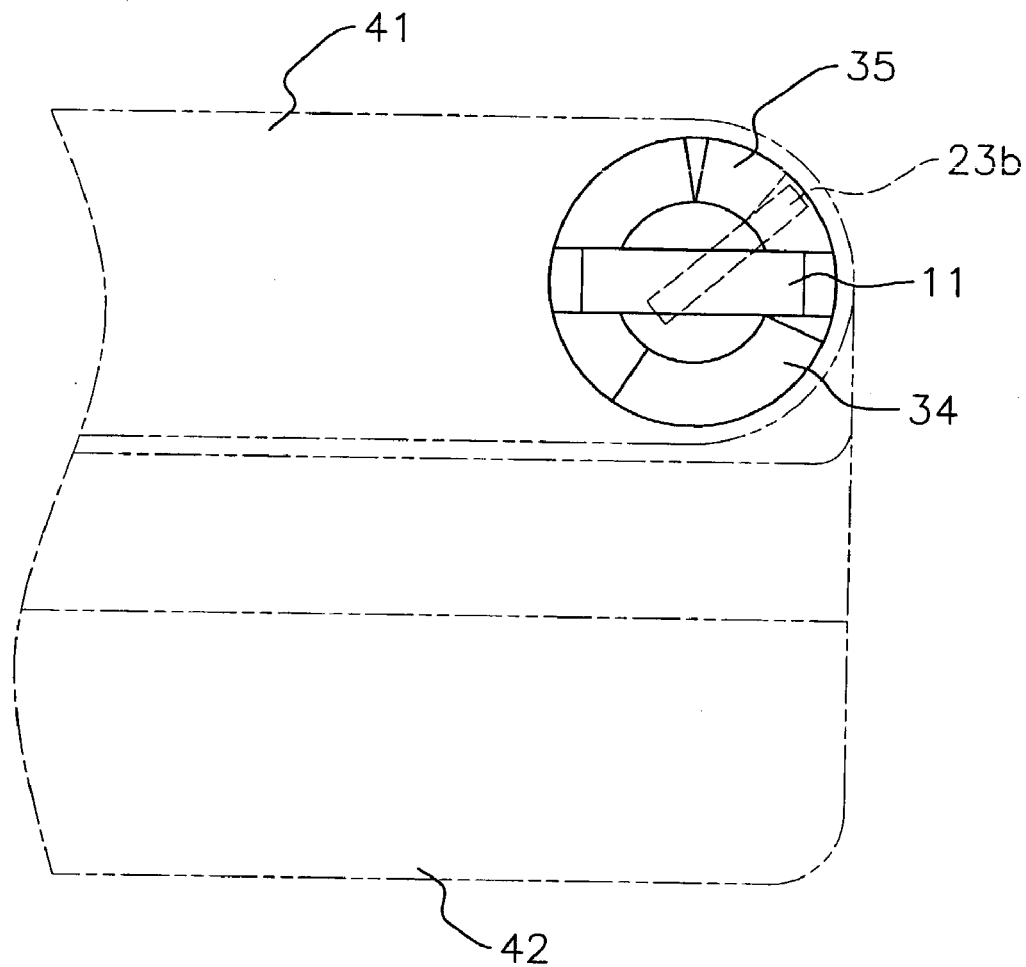
FIG. 4 is a schematic view showing the relative position between the stop and the limit when the computer screen engages with the main frame of the laptop computer.
Figure 5:
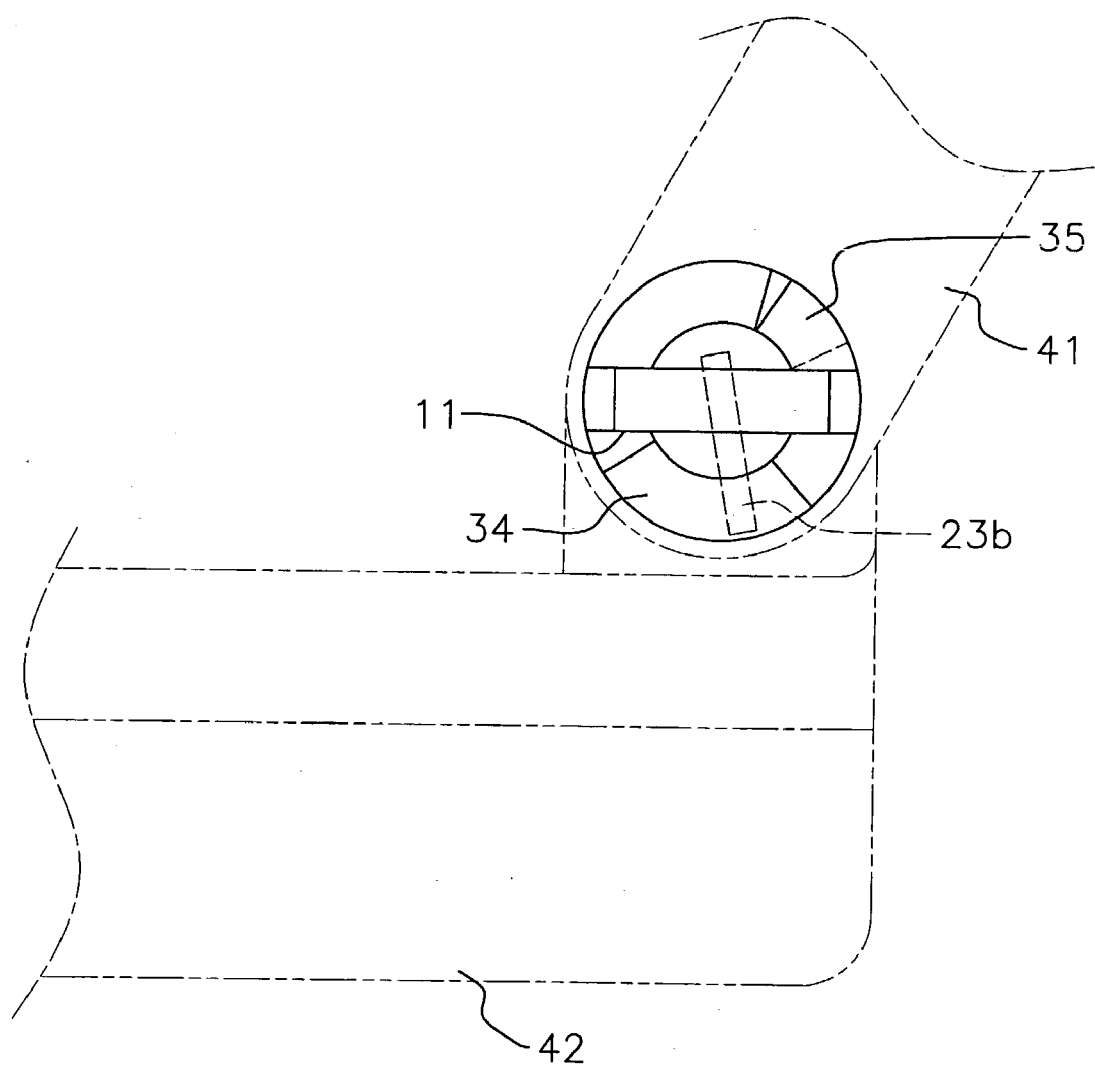
FIG. 5 is a schematic view showing the relative position between the stop and the limit when the computer screen detaches from the main frame of the laptop computer.
Figure 6:
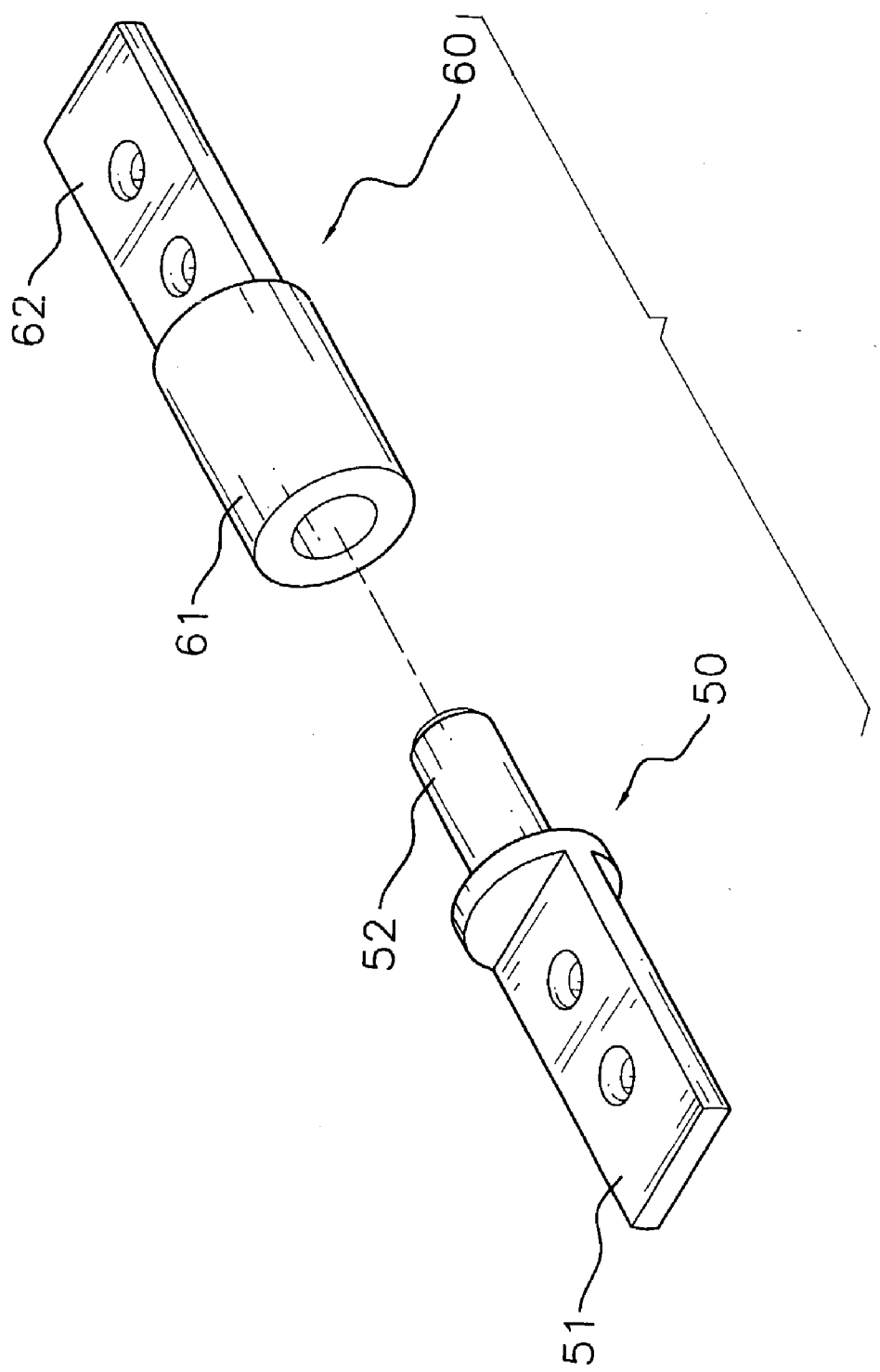
FIG. 6 is an exploded perspective view of a conventional computer hinge.

With reference to FIGS. 4 and 5, it is noted that when the screen (41) engages with the main frame (42), one end of the block (34) abuts a top face of the first connection portion (11). Meanwhile, the limit engages with the stop (35) on the sleeve (30). The abutment of the block (34) to the top face of the first connection portion (11) and the limit (23) to the stop (35) provide a force to separate the screen (41) from the main frame (42) after the locking device (not shown) on the laptop computer is released.

When the screen (41) is lifted and away from the main frame (42), the other end of the block (34) hinders further movement of the screen (41) relative to the main frame (42). That is, the other end of the block (34) engages with the bottom face of the first connection portion (11) after the screen (41) is lifted and pivoted relative to the main frame (42), as shown in FIG. 5.

In summary, the engagement of one end of the block (34) and the bottom face of the first connection portion (11) and the engagement between the limit (23) and the stop (35) provide a force to push the screen (41) away from the main frame (42) so as to facilitate the user to further separate the screen (41) from the main frame (42). When the screen (41) is pivoted, the other end of the block (34) engages with the top face of the first connection portion (11) to stop further pivotal movement of the screen (41) and to position the screen (41) at a predetermined position.

It is concluded that the computer hinge of the present invention not only provides the necessary friction as well as lubrication, but also provides a force to facilitate the separation between the screen and the main frame as well as a stopping effect to the screen to position the screen at a predetermined position. Therefore, although the structure of the computer hinge of the present invention is simple, the function thereof is versatile.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer hinge comprising:
   a first stem having a first connection portion with through holes defined through the first connection portion to allow the first connection portion to be adapted to connect to a computer main frame and a first extension integrally formed with the first connection portion and having a first slit defined on an outer surface of the first extension;
   a second stem having a second connection portion with second through holes defined through the second connection portion to allow the second stem to be adapted to connect to a computer screen and a second extension integrally formed with the second connection portion and having a second slit defined on an outer surface of the second extension and a limit formed at a joint between the second connection portion and the second extension; and
   a hollow cylindrical sleeve to receive therein the first extension and the second extension of the first stem and the second stem respectively, the sleeve having a V-shaped cutout longitudinally defined in an outer surface of the sleeve, a notch radially defined in the outer surface of the sleeve to communicate with the V-shaped cutout and an inside of the sleeve, a third slit defined in an inner surface of the sleeve to correspond to the first slit and the second slit and an arcuate block integrally formed on one end face of the sleeve to engage with a bottom face of the first connection portion while the limit engages with a stop which is formed on the other end face of the sleeve to respectively provide a force to facilitate separation between the screen and the main frame and to engage with a top face of the first connection portion while the limit disengages with the stop to provide a stop effect after the screen is pivoted away from the main frame.

2. The computer hinge as claimed in claim 1, wherein the limit is composed of a through hole defined at the joint between the second connection portion and the second extension and a pin securely extending into the through hole.

3. A computer hinge comprising:
   a first stem having a first connection portion with through holes defined through the first connection portion to allow the first connection portion to be adapted to connect to a computer main frame and a first extension integrally formed with the first connection portion and having a first slit defined on an outer surface of the first extension;
   a second stem having a second connection portion with second through holes defined through the second connection portion to allow the second stem to be adapted to connect to a computer screen and a second extension integrally formed with the second connection portion and having a second slit defined on an outer surface of the second extension and a limit formed at a joint between the second connection portion and the second extension; and
   a hollow cylindrical sleeve to receive therein the first extension and the second extension of the first stem and the second stem respectively, the sleeve having a V-shaped cutout longitudinally defined in an outer surface of the sleeve, a notch radially defined in the outer surface of the sleeve to communicate with the V-shaped cutout and an inside of the sleeve, a third slit defined in an inner surface of the sleeve to correspond to the first slit and the second slit and an arcuate block integrally formed on one end face of the sleeve to engage with a bottom face of the first connection portion while the limit engages with a stop which is formed on the other end face of the sleeve to be opposite to the arcuate block to respectively provide a force to facilitate separation between the screen and the main frame and to engage with a top face of the first connection portion while the limit disengages with the stop to provide a stop effect after the screen is pivoted away from the main frame, wherein the limit is composed of a through hole defined at the joint between the second connection portion and the second extension and a pin securely extending into the through hole.

* * * * *